United States Patent [19]

Plepys

[11] 4,045,410

[45] Aug. 30, 1977

[54] CARBOXYLATED DIPHENYLETHER-FORMALDEHYDE COPOLYMER RESINS AND THEIR PREPARATION

[75] Inventor: Raymond A. Plepys, Lake Jackson, Tex.

[73] Assignee: The Dow Chemical Company, Midland, Mich.

[21] Appl. No.: 623,511

[22] Filed: Oct. 17, 1975

[51] Int. Cl.$^2$ ............................................. C08G 16/04
[52] U.S. Cl. ........................... 260/52; 260/29.3; 260/675; 260/831; 260/839; 428/460
[58] Field of Search ................................ 260/52, 675

[56] References Cited

U.S. PATENT DOCUMENTS 3,914,194  10/1975  Smith ..................................... 260/52

OTHER PUBLICATIONS

Die Makromolekulare Chemie 107 (1967) 196–203, Ninagawa et al.
Chem. Abstracts, vol. 80, 1974, 134033y, Yamamoto.
Chem. Abstracts, vol. 76, 1972, Masuko et al., 47505c.

Primary Examiner—Howard E. Schain
Attorney, Agent, or Firm—R. M. Mellom; G. R. Plotecher

[57] ABSTRACT

Novel copolymer resins having the repeating unit

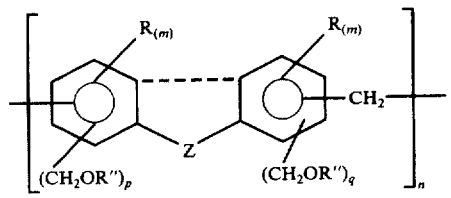

wherein each R is independently alkyl of 1 to about 10 carbon atoms or halogen, z is oxygen or sulfur, the dashed line is an optional chemical bond, the group represented by z taken with the dashed line represents dibenzofuran and dibenzothiophene moieties, or mixtures thereof, each R" is hydrogen or

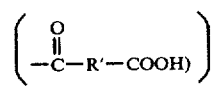

wherein each R' is a hydrocarbon or substituted hydrocarbon radical of from 2 to about 11 carbon atoms, $n$ averages about 3–10, each $m$ is 0–2 and $p$ and $q$ are each 0 or 1 with the proviso that the sum of $p$ and $q$ has an average value of 0.1–1.0 and there is an average of at least one carboxyl group per polymer molecule, are prepared by reacting a mixture comprising a hydroxymethylated diphenylether-formaldehyde copolymer with an anhydride of the formula

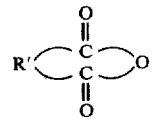

wherein R' is a hydrocarbon or substituted hydrocarbon radical of from 2 to about 11 carbon atoms, at a temperature between about 120° and about 170° C. The copolymer resins form stable aqueous solutions in the presence of base which, when heated in the presence of a water-soluble curing agent, such as hexamethoxymethylmelamine, yield glossy, flexible and impact-, solvent-, and water-resistant films.

13 Claims, No Drawings

1

CARBOXYLATED DIPHENYLETHER-FORMALDEHYDE COPOLYMER RESINS AND THEIR PREPARATION

BACKGROUND OF THE INVENTION

1. Field of the Invention

This invention relates to diphenylether-formaldehyde copolymer resins and their preparation. In one aspect, this invention relates to carboxylated diphenylether-formaldehyde copolymer resins wherein the copolymer has an average value of 0.1 to 1 for the number of carboxyl groups per repeating unit and there is an average of at least one carboxyl group per polymer.

The term "diphenylether" as used herein includes the corresponding thioether.

2. Description of the Prior Art

Resins prepared from the reaction of diphenylether and formaldehyde are not new. *Makromol. Chem.*, 97, 163–73 (1966). Hydroxymethylated diphenylether-formaldehyde copolymers are also known. Masuko (JAP No. 46-34112). However, the art is deficient of a carboxylated diphenylether-formaldehyde copolymer resin, a process for its preparation, or a stable aqueous solution made therefrom.

SUMMARY OF THE INVENTION

According to this invention a novel copolymer resin having the repeating unit

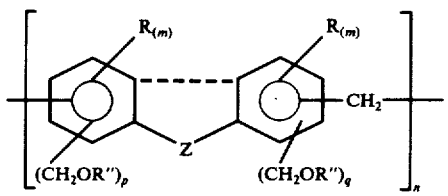

wherein each R is independently alkyl of 1 to about 10 carbon atoms or halogen, z is oxygen or sulfur, the dashed line is an optional chemical bond, the group represented by z taken with the dashed line represents dibenzofuran and dibenzothiophene moieties, or mixtures thereof, each R" is hydrogen or

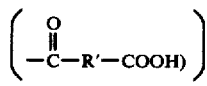

wherein each R' is a hydrocarbon or substituted hydrocarbon radical of from 2 to about 11 carbon atoms, n averages about 3–10, each m is 0–2 and p and q are 0 or 1 with the proviso that the sum of p and q has an average value of 0.1–1.0 and there is an average of at least one carboxyl group per polymer molecule, is prepared by reacting a hyroxymethylated diphenylether-formaldehyde copolymer and a carboxylic acid anhydride at a temperature between about 120° and 170° C. This resin forms a stable water solution in the presence of base and forms a useful film upon curing, which can be effected by heat or a curing agent, such as a strong inorganic acid or a bi- or polyfunctional crosslinking agent. This resin is also a good curing agent for epoxy resins.

DETAILED DESCRIPTION OF THE INVENTION

The hydroxymethylated diphenylether-formaldehyde copolymer here used as starting material has the repeating unit

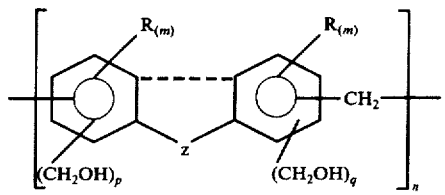

wherein R is independently an alkyl group of 1 to about 10 carbon atoms or a halogen, z is oxygen or sulfur, the dashed line is an optional chemical bond, the group represented by z taken with the dashed line represents dibenzofuran and dibenzothiophene moieties, or mixtures thereof, n averages about 3–10, m is 0–2 and p and q are 0 or 1 with the proviso that the sum of p and q has an average value of 0.1–1 and there is an average of at least one hydroxymethyl group per polymer. Typical alkyls include methyl, ethyl, propyl, octyl, decyl, isopropyl, isobutyl, sec-butyl, tert-butyl, neopentyl, and the like with the branched, lower alkyls (1–5 carbon atoms) preferred. Chlorine and bromine are the preferred halogens although fluorine and iodine are also suitable. Of course, in the embodiments where the dashed line is absent, z (oxygen or sulfur) is the only linkage between the benzene nuclei.

A hydroxymethyl group does not necessarily appear upon every aromatic ring in the polymer, but a hydroxymethyl group does appear at least once per every 10 repeating units. Moreoever, while it is possible that some molecules may not carry a hydroxymethyl group, at least about 90 percent do in any given resin. This percentage of hydroxymethylated resin is sufficient to react with a suitable anhydride to form the novel carboxylated copolymer resin. Further, the resins are complex resins wherein the location of the various substituents are not known but their location is not essential to this invention. Likewise, the end groups are not known but they are believed to be hydrogen, hydroxymethyl groups, or acyloxy ester groups.

These hydroxymethylated copolymer resins are typically prepared by reacting a mole of diaryl type compound, such as diphenylether, with between about 1.4 and about 10 moles of formaldehyde in a molar excess of a monocarboxylic acid having 1–6 carbons. The reactants are heated in the presence of a catalytic amount of a strong inorganic of organic acid in a temperature range from about 90° to about 150° C. Acyloxy resins are recovered from the reaction medium by precipitation with water, filtering and washing. The acyloxy resins are then subjected to basic hydrolysis and the hydroxymethylated resins are recovered and dried. Masuko (JAP No. 46-34112) teaches a similar preparation.

The aforedescribed copolymer resin is reacted with an anhydride of the formula

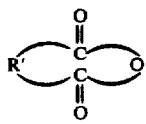

wherein R' is a hydrocarbon or substituted hydrocarbon radical of from 2 to about 11 carbon atoms. This hydrocarbon radical is either alkylene (—CH$_2$—CH$_2$—), alkenylene (—CH=CH—), or arylene

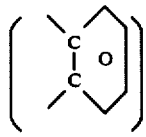

and may be C$_1$–C$_5$ alkyl, aryl, or halo (fluorine, chlorine, bromine, iodine) substituted. However when R' is alkylene or alkenylene the hydrocarbon radical generally does not exceed 4 carbon atoms and is unsubstituted. Typically, a hydrocarbon radical exceeding 6 carbon atoms is a substituted arylene group. Unsubstituted hydrocarbon radicals, such as ethylene and o-phenylene, are preferred. Illustrative anhydrides include but are not limited to: alkylene anhydrides such as succinic, glutaric, dihydrophthalic, and tetrahydrophthalic anhydrides; alkenylene anhydrides such as maleic and citraconic anhydrides; and arylene anhydrides such as phthalic, trimellitic, and 4-bromophthalic anhydrides.

Reaction time and temperature are critical to the preparation of these novel copolymer resins. Best results are obtained when the reaction mass is agitated at a temperature from about 120° C and preferably from about 140° C, with a temperature maximum of about 170° C and preferably about 160° C. Reaction time is about 10 minutes and preferably about 20 minutes, with a reaction time maximum of about 50 minutes and preferably about 40 minutes. At these temperatures, the reaction is conducted in the melt. Excessive temperatures or reaction times tend to degrade and crosslink (cure) the carboxylated resin, while temperatures below melt temperatures (approx. 120° C) result in difficult stirring and incomplete reaction.

The ratio of anhydride to hydroxymethylated diphenylether-formaldehyde copolymer resin here used is between about 0.1 to about 1.1 mole of anhydride per equivalent of hydroxy group in said resin. Generally, the preferred ratio of anhydride to said resin is about 1 mole of anhydride per equivalent of hydroxy group in said resin. However, this preferred ratio can vary with the intended purpose of the invention. For example, excess anhydride results in unreacted anhydride while less than a stoichiometric amount of anhydride leaves unreacted hydroxy groups on the resin. The former situation is desirable where the resin is used to cure an epoxy resin and the anhydride used is a known curing agent for epoxy resins, such as succinic anhydride. The latter situation is desirable where the resin is used to prepare a film since the unreacted hydroxy groups can crosslink on heating (by esterification). In effect, these variations offer additional modes of cure for the resultant resin.

The invention can be practiced in the presence or absence of a solvent. If a solvent is desired, it should dissolve both the hydroxymethylated diphenylether-formaldehyde copolymer resin and anhydride without reacting with either one. Typical solvents include dioxane, tetrahydrofuran, alkyl ethers of glycols, such as dimethoxyethane, and various ketones such as methyl ethyl ketone, methyl isobutyl ketone, and methyl n-butyl ketone. Preferably, the invention is practiced in the absence of a solvent.

Pressure is not critical to this invention except for its relationship to maintaining a reaction temperature in the aforespecified range. Ambient pressure is preferred.

Although the copolymer resins of this invention can be prepared in either batch or continuous operations, on a commercial scale the process parameters are better handled in the latter. The necessary high temperatures and short reaction times favor the continuous removal of product from the reaction conditions to avoid product degradation. This continuous removal is facilitated by conducting the reaction in an extrusion zone, such as a resin extruder.

Upon being cured the carboxylated diphenylether-formaldehyde copolymer resin yields a glossy, highly flexible, impact-, solvent-, and water-resistant film suitable for coating steel (such as tin-free and cold-rolled), aluminum and other similar substances. The carboxylated copolymer resin is thermosettable (heat curable) in either the presence or absence of a curing agent. Suitable agents include strong acids, such as p-toluene-sulfonic acid, sulfuric acid and phosphoric acid, and bi- or greater functional crosslinking agents such as methylol- or methoxymethyl melamines, methylol-or methoxymethyl ureas, methylol- or methoxymethyl phenols, or epoxy resins. Curing amounts of curing agent are, of course, required.

The carboxylated copolymer resin forms a stable aqueous solution in the presence of base. Suitable bases include ammonia, alkyl amines, and alkanolamines with the tertiary alkanolamine preferred. By way of illustration, typical amines and alkanolamines include: propyl, butyl, octyl, and decyl amine; diethyl, dipropyl, etc. amines; triethyl, tripropyl, etc., amine; 2-amino-2-methyl-1-propanol, dimethylethanolamine, and the like. The alkyl moiety of the alkyl amine or alkanol amine can bear inert substituents, such as halogen. The stable aqueous solution is thermosettable and thus if heated in the presence of a suitable, water-soluble curing agent, such as hexamethoxymethylmelamine or tetramethylol bisphenol A, a cured resin remains upon evaporation of the water and base. This composition can be cast and cured into a film having all the properties described in the preceding paragraph.

The following examples are illustrative of certain specific embodiments of this invention. However, these examples are for illustrative purposes only and are not to be construed as limitations upon the invention.

SPECIFIC EMBODIMENTS

EXAMPLE 1

A mixture of 50 g (0.125 hydroxy equiv.) of a hydroxymethylated diphenylether-formaldehyde copolymer of 940 average molecular weight and about 400 hydroxy equivalent weight and 12.5 g (0.125 mole) of succinic anhydride was placed in a resin pot and heated with stirring to 150° C. After 10 min., analysis by nuclear magnetic resonance spectroscopy showed complete conversion of the hydroxymethylated resin to the carboxylated resin. After 30 min. at 150° C, the molten tan resin was poured from the resin pot into a blender. Upon cooling, dry ice was added and the dry ice/resin mixture was blended. A tan solid with a softening point of 40°-45° C was quantitatively recovered. This resin was soluble in aqueous solutions of ammonia and mono-/di- or trialkyl amines.

EXAMPLE 2

Example 1 was repeated except phthalic anhydride was substituted for succinic anhydride. Again, a quantitative yield was recovered. This resin was a white powder with a softening point of 55°-63° C. Nuclear magnetic resonance confirmed complete conversion of the hydroxymethylated diphenylether-formaldehyde copolymer resin to the carboxylated copolymer resin. The carboxylated copolymer resin was also soluble in similar, basic, aqueous solutions.

EXAMPLE 3

A solution was prepared from 10 g (0.025 equiv.) of the carboxylated resin prepared in Example 1 (hereinafter referred to as the succinic resin), 20 ml of water, and 2.5 g (0.028 equiv.) of dimethylethanolamine. To this solution was added 2 g of Cyrez 965* resin, an American Cyanamid product (hexamethoxymethylmelamine). This solution was spread upon phosphatized 24 ga. steel panels with a wire-wound rod, dried, and cured for 20 min. at 175° C. The resulting panels had a clear, glossy film that withstood 160 in. lbs. forward and reverse impact as determined on a Gardner Variable Impact Tester. The samples also withstood 100 double rubs with a cloth soaked in methyl ethyl ketone without softening or loss of gloss. The pencil hardness of the coatings was about 6H.

The same solutions also gave similar coatings on tin-free steel, cold-rolled steel, and aluminum. The coated aluminum panels, 0.025 in. thickness, withstood 40 in. lbs. forward and reverse impact, had a pencil hardness of 6H, and withstood over 100 double rubs with methyl ethyl ketone. The aluminum panels also retained gloss and hardness after 30 minutes immersion in boiling water.

EXAMPLE 4

Bonderized 24 ga. steel panels were coated with a solution of 10 g (0.025 equiv.) succinic resin, 2 g (0.0225 equiv.) dimethylethanolamine, 25 ml water and 5 g of titanium oxide (TiO$_2$) and were cured for 20 min. at 175° C. The coated steel panels were then placed in various solvents for 16 hours at room temperature. No effect was noted in water, 1 N sodium hydroxide, methanol, ethanol, methyl ethyl ketone, benzene, 1-butanol, xylene, cyclohexane, and perchloroethylene. Disbondment was noted at the air-liquid interface in methylene chloride and dioxane.

EXAMPLE 5

A resin was made from a blend of 50 percent succinic resin in methyl ethyl ketone and 50 percent epoxy resin (a solid diglycidyl ether of bisphenol-A with a 900 equiv. wt. manufactured by The Dow Chemical Co. under the tradename DER 664) in 50/50 xylene/2-butoxyethanol in the ratio of 5 parts to 9 parts respectively. This solution was treated with a flow control agent (0.1 percent resin wt. of a 50% solution of a silicone resin manufactured by BYK Mallincrodt under the tradename BYK 300) and coated onto 4 × 12 × 0.025 in. aluminum panels. Said panels were cured for about 15 minutes at 350° F. The cured panels had a glossy appearance and withstood 40 in. lbs. forward impact, 25 double rubs with methyl ethyl ketone, and showed no effect after exposure to boiling water for 30 minutes. Moreover, the coating showed no evidence of cracking when the panel was bent back on itself (180°) in a T-bend test.

In the preceding detailed description and examples, polymers prepared from diphenylether were used to illustrate this invention. However, useful polymers are also prepared by replacing diphenylether with:

a. dibenzofuran;
b. dibenzothiophene;
c. diphenylthioether;
d. any of the above either alkylated, halogenated, or both;
e. diphenylether either alkylated, halogenated or both; or
f. any combination of the above.

Of course, these various other embodiments are prepared in the same manner as described for the diphenylether-formaldehyde copolymer resins.

While the invention has been described with specific reference to particuiar embodiments, it is to be understood that it is not to be limited thereto but is to be construed broadly and restricted solely by the scope of the appended claims.

What is claimed is:

1. A copolymer resin having the repeating unit

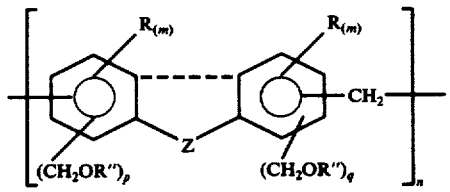

wherein each R is independently an alkyl group of 1 to about 10 carbon atoms or a halogen, z is oxygen or sulfur, the dashed line is an optional chemical bond, the group represented by z taken with the dashed line represents dibenzofuran and dibenzothiophene moieties, or mixtures thereof, each R" is hydrogen or

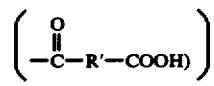

wherein each R' is a substituted or unsubstituted alkylene or arylene radical of 2 to about 11 carbon atoms, n averages about 3-10, each m is 0-2, and p and q are each 0 or 1 with the proviso that the sum of p and q has an average value of 0.1-1 and there is an average of at least one carboxyl group per polymer molecule.

2. The copolymer resin of claim 1 wherein z is oxygen.

3. The copolymer resin of claim 2 wherein the dashed line is absent.

4. The copolymer resin of claim 3 wherein each R is a branched, lower alkyl.

5. The copolymer resin of claim 3 wherein each m is 0.

6. The copolymer resin of claim 5 wherein R' is ethylene.

7. The copolymer resin of claim 5 wherein R' is o-phenylene.

8. The copolymer resin of claim 1 which includes a curing amount of a curing agent.

9. The copolymer resin of claim 8 in a cured state.

10. A process for preparing the copolymer resin having the repeating unit of claim 1 comprising heating with agitation a mixture comprising
   a. a hydroxymethyl substituted diphenylether-formaldehyde copolymer resin having the repeating unit

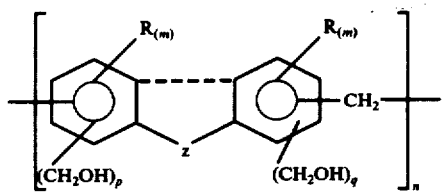

wherein each R is independently alkyl of 1 to about 10 carbon atoms or halogen, z is oxygen or sulfur, the dashed line is an optional chemical bond, the group represented by z taken with the dashed line represents dibenzofuran and dibenzothiophene moieties, or mixtures thereof, n averages about 3–10, m is 0–2, and p and q are each 0 or 1 with the proviso that the sum of p and q has the average value of 0.1–1 and there is an average of at least one hydroxymethyl group per polymer molecule, and
   b. an anhydride of the formula

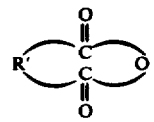

wherein R' is a substituted or unsubstituted alkylene or arylene radical of from 2 to about 11 carbon atoms,
to a temperature between about 120° C and about 170° C for about 10 to about 50 minutes wherein the ratio of (b) to (a) is between about 0.1 to about 1.1 mole of (b) per equivalent hydroxyl group in (a).

11. The process of claim 10 wherein the mixture is heated to a temperature between about 140° and about 160° C for about 20 to 40 minutes.

12. The process of claim 10 wherein the ratio of (b) to (a) is about 1 mole of (b) per equivalent of hydroxy group in (a).

13. The process of claim 10 wherein the mixture is heated in an extrusion zone.

* * * * *